US010096162B2

(12) United States Patent
Gonzalez del Rosario (10) Patent No.: US 10,096,162 B2
(45) Date of Patent: Oct. 9, 2018

(54) HEADSET VISION SYSTEM FOR PORTABLE DEVICES THAT PROVIDES AN AUGMENTED REALITY DISPLAY AND/OR A VIRTUAL REALITY DISPLAY

(71) Applicant: Dimensions and Shapes, LLC, Tampa, FL (US)

(72) Inventor: Segundo Gonzalez del Rosario, Tampa, FL (US)

(73) Assignee: Dimensions and Shapes, LLC, Tampa, FL (US)

( * ) Notice: Subject to any disclaimer, the term of this patent is extended or adjusted under 35 U.S.C. 154(b) by 196 days.

(21) Appl. No.: 14/977,105

(22) Filed: Dec. 21, 2015

(65) Prior Publication Data

US 2016/0180596 A1   Jun. 23, 2016

Related U.S. Application Data

(60) Provisional application No. 62/095,686, filed on Dec. 22, 2014.

(51) Int. Cl.
*G06F 3/01* (2006.01)
*G06T 19/00* (2011.01)
(Continued)

(52) U.S. Cl.
CPC ........ *G06T 19/006* (2013.01); *G02B 27/0172* (2013.01); *G02B 27/0179* (2013.01); *G02B 27/22* (2013.01); *G06F 3/011* (2013.01); *G06F 3/013* (2013.01); *H04N 13/044* (2013.01); *H04N 13/344* (2018.05); *G02B 2027/0138* (2013.01); *G02B 2027/0187* (2013.01)

(58) Field of Classification Search
CPC .............. G06T 19/006; G02B 27/0172; G02B 27/0179; G02B 27/22; G06F 3/011; G06F 3/013; H04N 13/044
See application file for complete search history.

(56) References Cited

U.S. PATENT DOCUMENTS

| 6,421,031 B1 * | 7/2002 | Ronzani | G02B 27/017 345/8 |
| 2012/0021806 A1 | 1/2012 | Maltz | |

(Continued)

FOREIGN PATENT DOCUMENTS

JP     2011-198304     10/2011

OTHER PUBLICATIONS

Mizan U., HattrickWare: The Augmented Reality Hat (Canceled), Project Launched Sep. 22, 2014, Pages printed Mar. 23, 2016 from https://www.kickstarter.com/projects/1143620156/hattrickwear-the-augmented-reality-hat/description; 30 pages.

(Continued)

*Primary Examiner* — Lisa Landis
(74) *Attorney, Agent, or Firm* — Foley & Lardner LLP (57) ABSTRACT

A headset vision system includes a headwear and a coordinated mirror device. The coordinate mirror device includes a first mirror, a second mirror, and a lens. The first mirror is configured to reflect a display of a portable device to the second mirror such that the second mirror reflects the display to the lens. The lens is configured to focus the display. The headwear defines a cavity configured to receive at least one of the portable device and the coordinated mirror device.

20 Claims, 7 Drawing Sheets

(51) Int. Cl.
*H04N 13/04* (2006.01)
*G02B 27/01* (2006.01)
*G02B 27/22* (2018.01)
*H04N 13/344* (2018.01)

(56) References Cited

U.S. PATENT DOCUMENTS

| | | | | |
|---|---|---|---|---|
| 2013/0163090 A1* | 6/2013 | Yu | ............................ | G06F 3/011 |
| | | | | 359/630 |
| 2014/0063054 A1* | 3/2014 | Osterhout | ............... | G06F 3/005 |
| | | | | 345/633 |
| 2014/0320974 A1* | 10/2014 | Magyari | ............ | G02B 27/0172 |
| | | | | 359/631 |
| 2014/0361987 A1* | 12/2014 | Bickerstaff | ............. | G06F 3/013 |
| | | | | 345/156 |
| 2017/0255018 A1* | 9/2017 | Goldstein | .......... | G02B 27/0176 |

OTHER PUBLICATIONS

International Search Report for Patent Application No. PCT/US2015/067117, dated Apr. 16, 2016, 12 pages.

\* cited by examiner

HEADSET VISION SYSTEM FOR PORTABLE DEVICES THAT PROVIDES AN AUGMENTED REALITY DISPLAY AND/OR A VIRTUAL REALITY DISPLAY

CROSS-REFERENCE TO RELATED PATENT APPLICATIONS

This application claims the benefit of and priority to U.S. Provisional Patent Application No. 62/095,686, titled "Headset Vision System for Portable Devices," filed Dec. 22, 2014, which is incorporated herein by reference in its entirety.

BACKGROUND

Headset vision systems are used to provide a display to a user. The display of traditional headset vision systems may provide an augmented reality view or a virtual reality view to the user. Traditional virtual reality system cover the entire field of view of a user at all times and are not configured to provide augmented reality. While traditional augmented reality system are only capable of providing an augmented reality view since they are unable to cover an entire field of view of a user.

SUMMARY

One embodiment relates to a headset vision system. The headset vision system includes a headwear and a coordinated mirror device. The coordinate mirror device includes a first mirror, a second mirror, and a lens. The first mirror is configured to reflect a display of a portable device to the second mirror such that the second mirror reflects the display to the lens. The lens is configured to focus the display. The headwear defines a cavity configured to receive at least one of the portable device and the coordinated mirror device.

Another embodiment relates to a headset vision system. The headset vision system includes a coordinated mirror device. The coordinated mirror device is configured to provide at least one of an augmented reality representation of a display of a display device to a user and a virtual reality representation of the display of the display device to the user. The coordinated mirror device includes a first set of mirrors positioned to correspond with a first eye of the user and a second set of mirrors positioned to correspond with a second eye of the user. The first set of mirrors and the second set of mirrors are selectively reconfigurable between a storage configuration and an extended configuration.

Another embodiment relates to a headset vision system. The headset vision system includes a processing circuit configured to control operation of the headset vision system. The processing circuit includes a mirror module, a display module, and an input module. The mirror module is configured to determine an arrangement of a coordinated mirror device. The display module is configured to provide a stereoscopic display on a screen of a portable device based on the arrangement of the coordinated mirror device such that the stereoscopic display is correctly sized and positioned on the screen. The input module is configured to receive inputs from a user of the headset vision system such that the user is able to control the headset vision system without accessing the portable device. According to an exemplary embodiment, the headset vision system is configured to provide at least one of an augmented reality representation of the stereoscopic display and a virtual reality representation of the stereoscopic display to the user via the coordinated mirror device.

The foregoing summary is illustrative only and is not intended to be in any way limiting. In addition to the illustrative aspects, embodiments, and features described above, further aspects, embodiments, and features will become apparent by reference to the drawings and the following detailed description. Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the Figures generally, various embodiments disclosed herein relate to a headset vision system capable of providing at least one of an augmented reality display and a virtual reality display to a user with a coordinated mirror device having a first set of mirrors and/or a second set of mirrors. The augmented reality display uses the first set of mirrors, while the virtual reality display uses the first set of mirrors and the second set of mirrors. The headset vision system allows a user to use his or her own portable device to provide a display to the coordinated mirror device of the headset vision system. The headset vision system is configured such that when arranged in a storage configuration, the portable device and the coordinated mirror device are not visible. However, when at least one of the first set of mirrors and the second set of mirrors are arranged in an extended configuration, a portion of one or both of the first set of mirrors and the second set of mirrors are visible such that either an augmented reality display or a virtual reality display is provided to the user.

Figure 1:
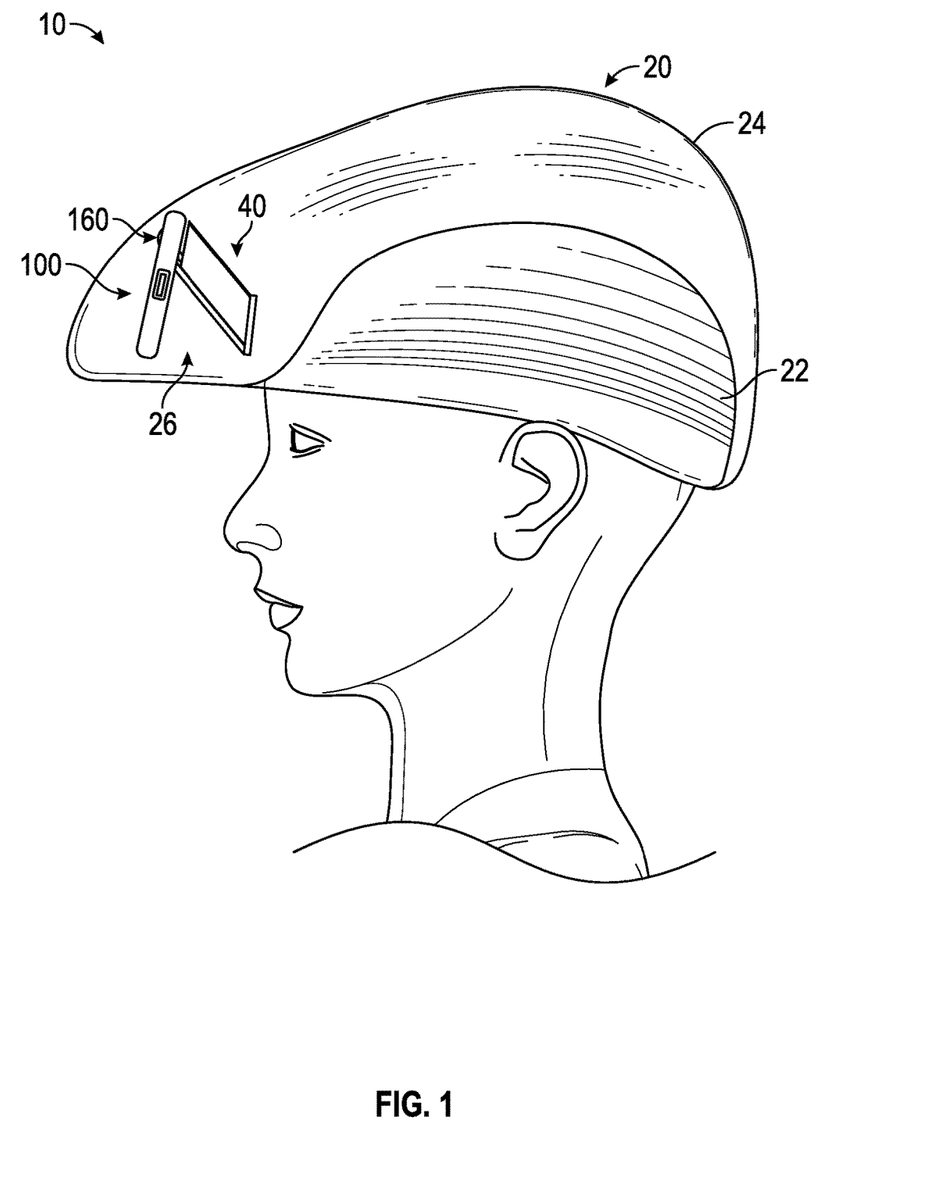
FIG. 1 is a perspective view of a user wearing a headset vision system, according to an exemplary embodiment.
Figure 2:
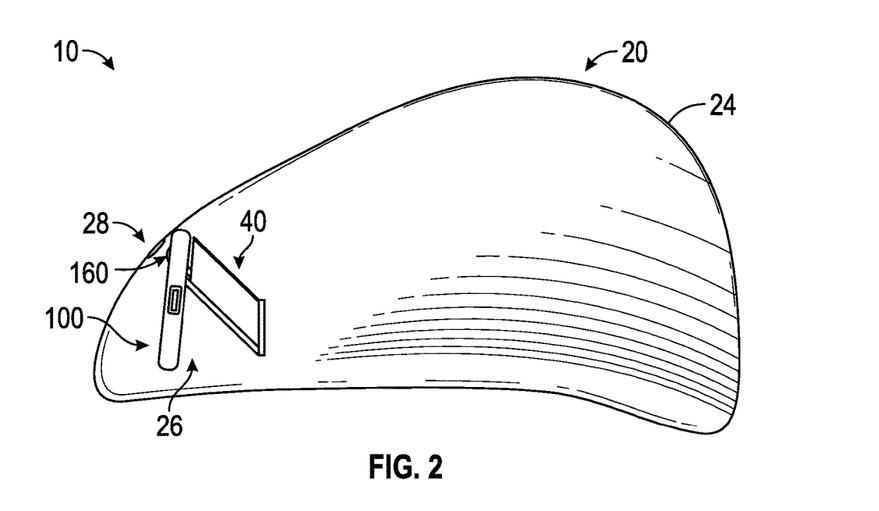
FIG. 2 is a side plan view of the headset vision system of FIG. 1, according to an exemplary embodiment.
Figure 3:
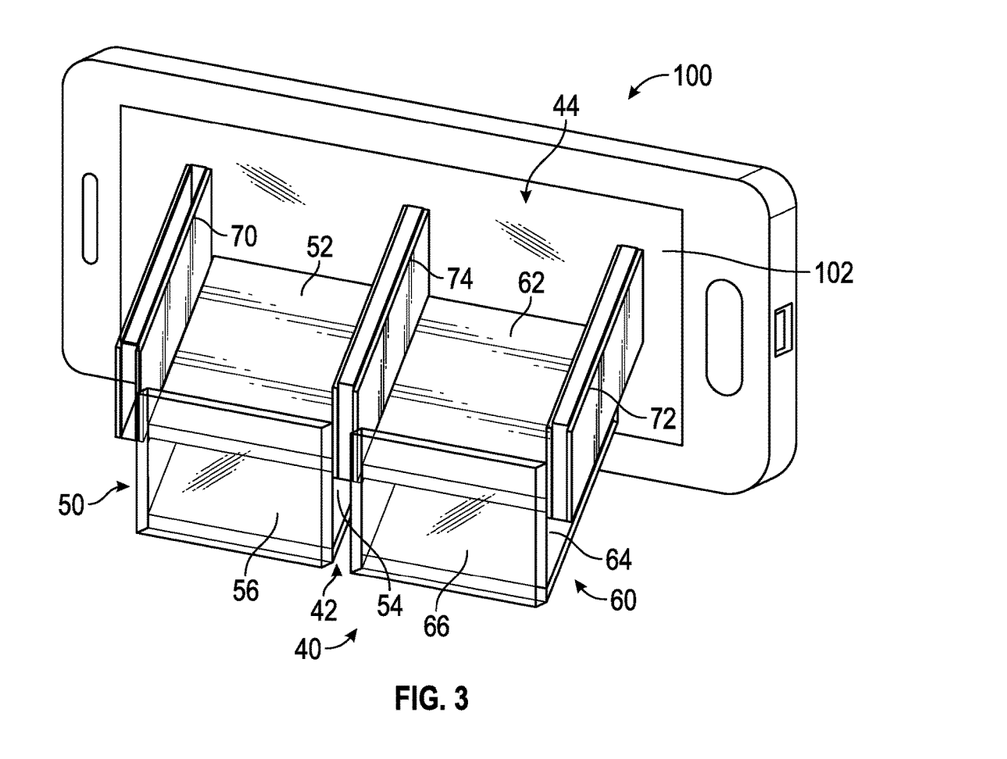
FIG. 3 is a side perspective view of a headset vision system, according to an exemplary embodiment.

According to the exemplary embodiment shown in FIGS. 1-2, a headset vision system, shown as headset vision system 10, includes headwear, shown as hat 20. By way of example, hat 20 may be any type of headwear structured to be worn on the head of a user (e.g., a baseball cap, a beret, a flat cap, a Gatsby cap, etc.). As shown in FIG. 1, hat 20 includes a first portion, shown a lower portion 22. Lower portion 22 is configured to rest on the head of a user. In one embodiment, lower portion 22 is structured similar to a baseball hat. In other embodiments, lower portion 22 is otherwise structured. As shown in FIG. 1, hat 20 includes a second portion, shown as upper portion 24. In one embodiment, upper portion 24 is attached (e.g., fastened, stitched, glued, etc.) to lower portion 22. In another embodiment, lower portion 22 and upper portion 24 are integrally formed such that hat 20 is a single, continuous structure. As shown in FIG. 1, upper portion 24 is offset a distance from lower portion 22 such that hat 20 defines an internal cavity, shown as cavity 26.

As shown in FIGS. 1-2, headset vision system 10 includes a portable device, shown as portable device 100, and a reflective device, shown as coordinated mirror device 40. In one embodiment, coordinated mirror device 40 is configured as a periscope device. In other embodiments, coordinated mirror device 40 is configured in another arrangement that differs from a traditional periscope device. In one embodiment, portable device 100 is a smart phone. In other embodiments, portable device 100 is a cell phone, a tablet, an e-reader, or still another portable device. As shown in FIGS. 1-2, hat 20 is structured such that portable device 100 and coordinated mirror device 40 fit within cavity 26. The size of hat 20 may be varied to fit various users and/or to accommodate various types of portable devices 100.

By way of example, coordinated mirror device 40 may be arranged in two configurations, an extended configuration (e.g., an operating configuration, a first configuration, etc.) and a storage configuration (e.g., an off configuration, a second configuration, etc.). Portable device 100 and coordinated mirror device 40 may be hidden (e.g., not visible, etc.) within cavity 26 of hat 20 such that the user and/or surrounding people cannot see portable device 100 and coordinated mirror device 40 (e.g., when in the storage configuration, etc.). According to an exemplary embodiment, at least a portion of coordinated mirror device 40 is configured to extend such that the extended portion thereof is visible to the user (e.g., when in the extended configuration, etc.). As shown in FIGS. 1-2, coordinated mirror device 40 is arranged in the storage configuration such that coordinated mirror device 40 and portable device 100 are hidden within cavity 26 of hat 20.

According to the exemplary embodiment shown in FIGS. 3-10, coordinated mirror device 40 is arranged in the extended configuration such that at least a portion of coordinated mirror device 40 is extended. In the extended configuration, portable device 100 provides a display to coordinated mirror device 40 such that either an augmented reality (AR) display or a virtual reality (VR) display is presented to a user of headset vision system 10.

As shown in FIGS. 3-6 and 9-10, coordinated mirror device 40 includes a first end, shown as proximal end 42 (e.g., lens end, etc.), and an opposing second end, shown as distal end 44 (e.g., display end, screen end, etc.). As shown in FIGS. 3-7 and 9-10, coordinated mirror device 40 includes a first wall, shown as left wall 70, a second wall, shown as right wall 72, and a third wall, shown as center wall 74. As shown in FIGS. 3-10, coordinated mirror device 40 include a first set of mirrors, shown as left set of mirrors 50, positioned between left wall 70 and center wall 74 and a second set of mirrors, shown as right set of mirrors 60, positioned between right wall 72 and center wall 74. Left set of mirrors 50 are positioned to correspond with a first eye (e.g., left eye, etc.) of the user of headset vision system 10 and right set of mirrors 60 are positioned to correspond with a second eye (e.g., right eye, etc.) of the user of headset vision system 10, according to an exemplary embodiment. According to an exemplary embodiment, at least one of left set of mirrors 50 and right set of mirrors 60 are rigidly attached to coordinated mirror device 40. In another embodiment, at least one of left set of mirrors 50 and right set of mirrors 60 are removably coupled to (e.g., detachable from, etc.) coordinated mirror device 40.

According to an exemplary embodiment, center wall 74 is structured as a single wall. By way of example, coordinated mirror device 40 may be assembled in various ways. In one embodiment, walls 70, 72, and 74 are rigidly attached (e.g., fixed, etc.) to coordinated mirror device 40. By way of example, a portion of left set of mirrors 50 (e.g., upper mirror 52, etc.) and/or a portion of right set of mirrors 60 (e.g., upper mirror 62, etc.) may be rigidly attached to walls 70, 72, and 74, respectively, forming a single structure (e.g., such that left set of mirrors 50 and right set of mirrors 60 cannot be detached from coordinated mirror device 40, etc.). By way of another example, at least one of left set of mirrors 50 and right set of mirrors 60 may be removably coupled to coordinated mirror device 40 such that left set of mirrors 50 and/or right set of mirrors 60 may be decoupled from coordinated mirror device 40. In other embodiments, left set of mirrors 50 includes left wall 70 and right set of mirrors 60 includes right wall 72. By way of example, left set of mirrors 50 and/or right set of mirrors 60 may be removably coupled (e.g., via fasteners, clips, screws, magnets, etc.) to center wall 74 such that when left set of mirrors 50 and/or right set of mirrors 60 are decoupled from coordinated mirror device 40, center wall 74 remains fixed to coordinated mirror device 40.

In an alternate embodiment, center wall 74 includes two center walls 74 coupled together (e.g., fastened via magnets, screws, clips, etc.). By way of example, left set of mirrors 50 may include left wall 70 and a first center wall 74 and right set of mirrors 60 may include right wall 72 and a second center wall 74. In some embodiments, left set of mirrors 50 or right set of mirrors 60 is omitted such that coordinated mirror device 40 includes one set of mirrors (e.g., a right or a left set of mirrors, a single, continuous set of mirrors that extends the entire length of coordinated mirror device 40, etc.).

Figure 4:
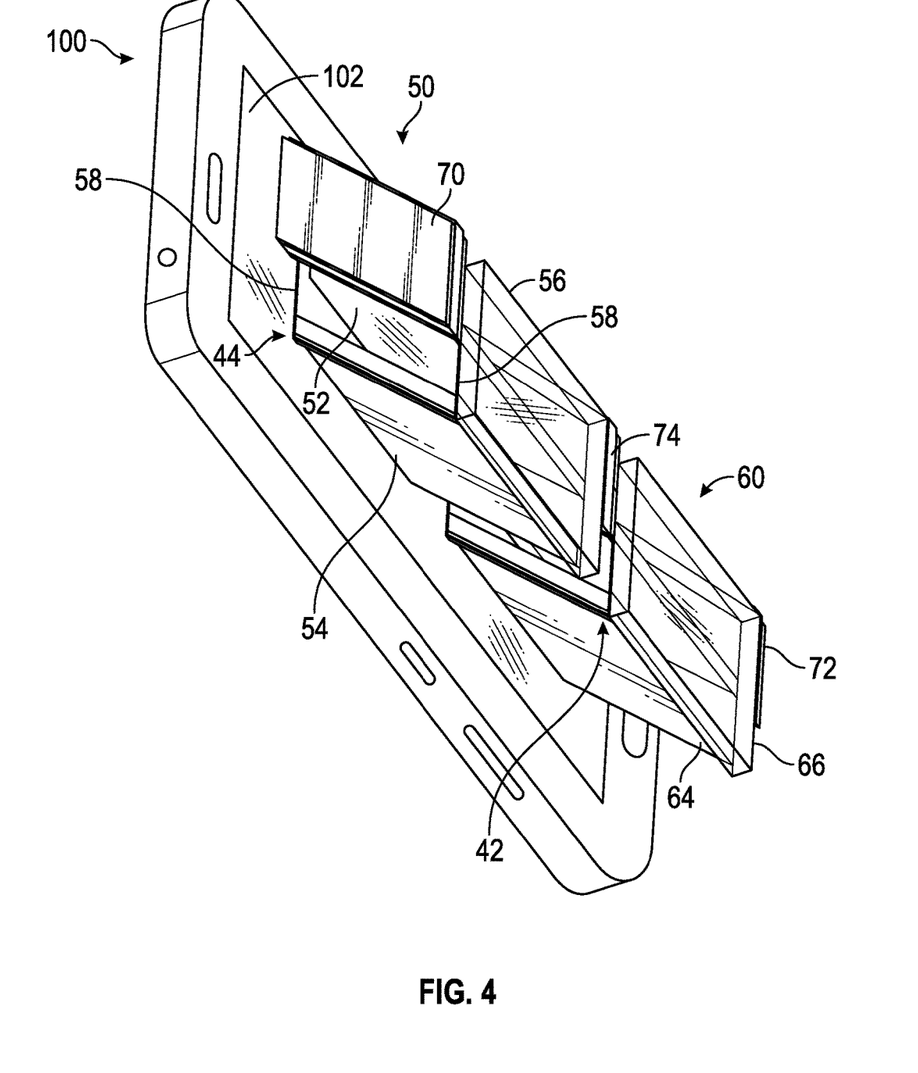
FIG. 4 is a bottom perspective view of the headset vision system of FIG. 3, according to an exemplary embodiment.
Figure 5:
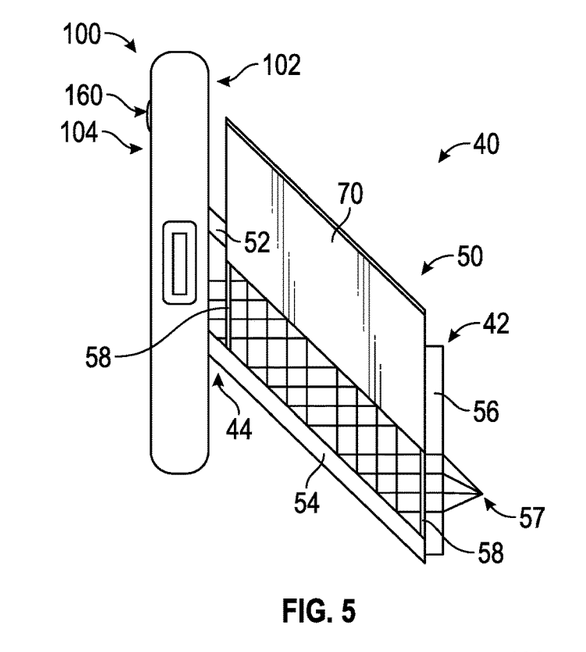
FIG. 5 is a left plan view of the headset vision system of FIG. 3, according to an exemplary embodiment.

As shown in FIGS. 3-5 and 7-10, left set of mirrors 50 includes a first reflective element, shown as upper mirror 52, and a second reflective element, shown as lower mirror 54. According to an exemplary embodiment, upper mirror 52 is parallel to lower mirror 54. As shown in FIGS. 4-5, left set of mirrors 50 include an extension feature, shown a telescoping feature 58, which couples upper mirror 52 to lower mirror 54. Telescoping feature 58 is configured to facilitate the extension and retraction of lower mirror 54 with respect to upper mirror 52 (e.g., a distance between upper mirror 52 and lower mirror 54 is varied, left set of mirrors 50 is selectively reconfigurable into a storage configuration or an extended configuration, etc.). As shown in FIGS. 3-5, 7, and 9-10, left set of mirrors 50 includes a lens, shown as lens 56, positioned at proximal end 42 of coordinated mirror device 40. In one embodiment, lens 56 is coupled to lower mirror 54 such that lens 56 moves with lower mirror 54 as lower mirror 54 is extended or retracted. According to an exemplary embodiment, upper mirror 52 and lower mirror 54 are angled at a forty-five degree angle relative to lens 56. In other embodiments, upper mirror 52 and/or lower mirror 54 are otherwise angled (e.g., thirty degrees, sixty degrees, etc. relative to lens 56).

Figure 6:
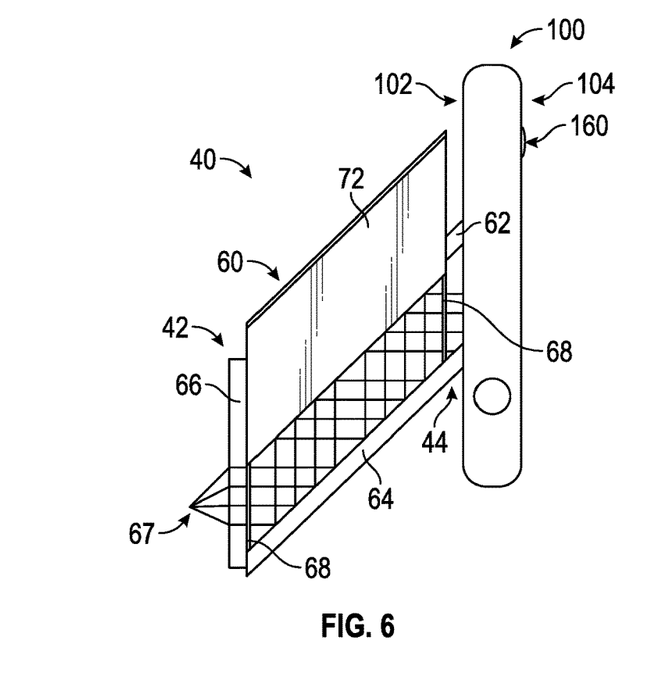
FIG. 6 is a right plan view of the headset vision system of FIG. 3, according to an exemplary embodiment.
Figure 7:
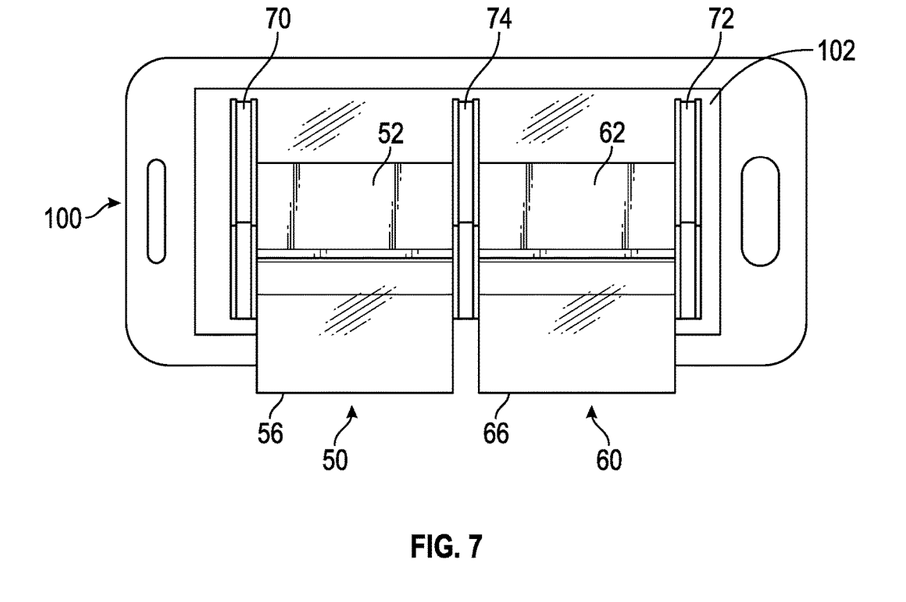
FIG. 7 is a front plan view of the headset vision system of FIG. 3, according to an exemplary embodiment.
Figure 8:
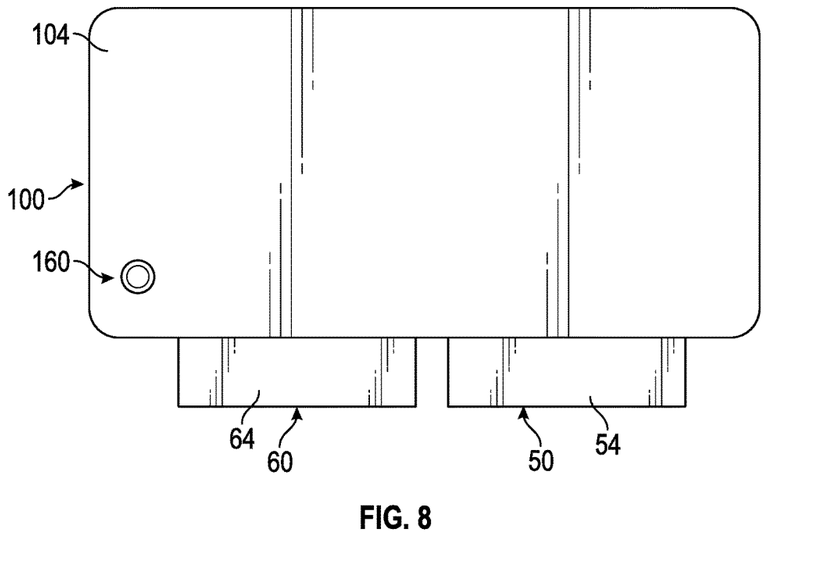
FIG. 8 is a rear plan view of the headset vision system of FIG. 3, according to an exemplary embodiment.
Figure 9:
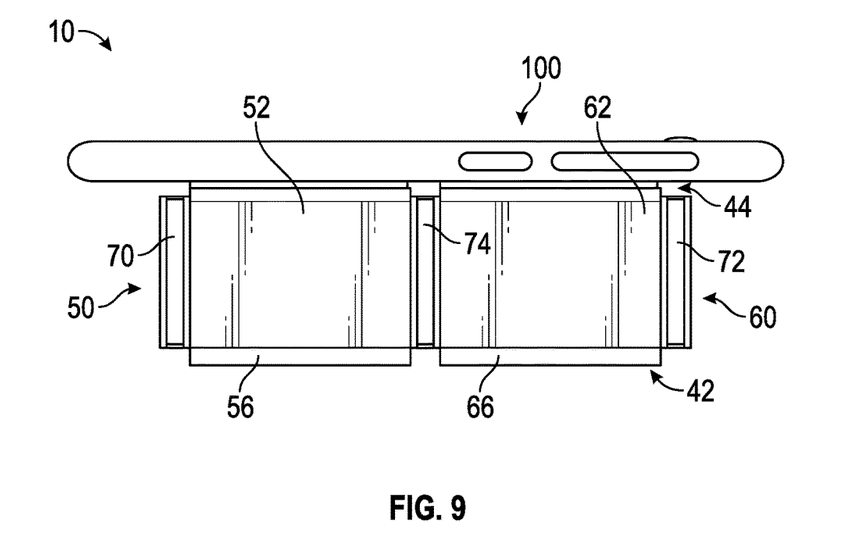
FIG. 9 is a top plan view of the headset vision system of FIG. 3, according to an exemplary embodiment.
Figure 10:
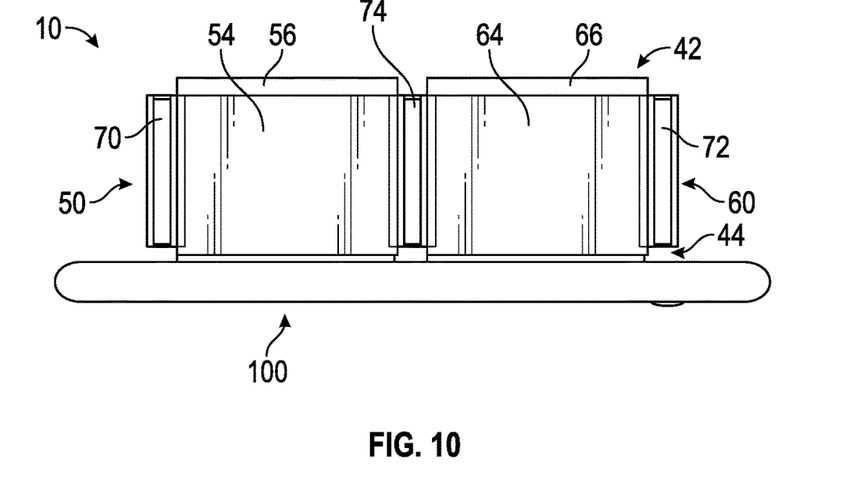
FIG. 10 is a bottom plan view of the headset vision system of FIG. 3, according to an exemplary embodiment.

As shown in FIGS. 3-4 and 6-10, right set of mirrors 60 includes a first reflective element, shown as upper mirror 62, and a second reflective element, shown as lower mirror 64. According to an exemplary embodiment, upper mirror 62 is parallel to lower mirror 64. As shown in FIG. 6, right set of mirrors 60 include an extension feature, shown a telescoping feature 68, which couples upper mirror 62 to lower mirror 64. Telescoping feature 68 is configured to facilitate the extension and retraction of lower mirror 64 with respect to upper mirror 62 (e.g., a distance between upper mirror 62 and lower mirror 64 is varied, right set of mirrors 60 is selectively reconfigurable into a storage configuration or an extended configuration, etc.), according to an exemplary embodiment. As shown in FIGS. 3-4, 6-7, and 9-10, right set of mirrors 60 includes a lens, shown as lens 66, positioned at proximal end 42 of coordinated mirror device 40. In one embodiment, lens 66 is coupled to lower mirror 64 such that lens 66 moves with lower mirror 64 as lower mirror 64 is extended or retracted. According to an exemplary embodiment, upper mirror 62 and lower mirror 64 are angled at a forty-five degree angle relative to lens 66. In other embodiments, upper mirror 62 and/or lower mirror 64 are otherwise angled (e.g., thirty degrees, sixty degrees, etc. relative to lens 66).

According to an exemplary embodiment, lower mirror 54 of left set of mirrors 50 and lower mirror 64 of right set of mirrors 60 are able to be extended individually. By way of example, left set of mirrors 50 may be arranged in an extended configuration while right set of mirrors 60 may be arranged in a storage configuration, or vice versa. By way of another example, both left set of mirrors 50 and right set of mirrors 60 may be arranged in the same configuration simultaneously (e.g., both retracted, extended, etc.). In one embodiment, telescoping feature 58 and/or telescoping feature 68 are manually extended and/or retracted by a user of headset vision system 10. In other embodiments, headset vision system 10 includes an actuator (e.g., a motor, a solenoid, etc.) positioned to automatically extend and/or retract telescoping features 58 and 68 based on a user command/input. By way of example, left set of mirrors 50 and/or right set of mirrors 60 may automatically be reconfigured into the extended configuration when headset vision system 10 is turned on. By way of another example, left set of mirrors 50 and/or right set of mirrors 60 may automatically be reconfigured into the storage configuration when headset vision system 10 is turned off.

As shown in FIGS. 3-8, portable device 100 includes a display surface, shown as screen 102, and a back surface, shown as back surface 104. In one embodiment, screen 102 is configured to provide a display to coordinated mirror device 40. The display may include, but not limited to, an image, a video, a video game, a text message, an email, a home screen, a mobile app, a camera display, an infrared (IR) display, and/or any other display provided by portable device 100.

As shown in FIGS. 3-6 and 9-10, distal end 44 of coordinated mirror device 40 is positioned along screen 102. According to an exemplary embodiment, distal end 44 of coordinated mirror device 40 is configured to receive the display from screen 102 such that the display is provided to one or both eyes of a user. As shown in FIGS. 5-6, a light path from the display of screen 102 travels through lens 56 of left set of mirrors 50 and/or lens 66 of right set of mirrors 60 when one or both are arranged in the extended configuration. According to an exemplary embodiment, light (e.g., of an image, a video, a videogame, etc.) is emitted from screen 102 which travels through distal end 44 of coordinated mirror device 40. The light reflects off of at least one of upper mirror 52 and upper mirror 62 (e.g., based on the configuration of left set of mirrors 50 and right set of mirrors 60, etc.). According to an exemplary embodiment, the light reflects off of upper mirror 52 and/or upper mirror 62 parallel to screen 102 of portable device 100. In turn, the light reflects off of lower mirror 54 and/or lower mirror 64 to lens 56 and/or lens 66, respectively. According to an exemplary embodiment, the reflected light enters perpendicular to lens 56 and/or lens 66.

As shown in FIGS. 5-6, lens 56 and lens 66 are positioned such that each is parallel to the screen 102 of portable device 100. According to an exemplary embodiment, lens 56 and lens 66 are configured to focus the light from screen 102 exiting proximal end 42 of coordinated mirror device 40 such that focused displays (e.g., images, videos, text, etc.), shown as left display 57 and right display 67, are presented to the eyes of the user. In one embodiment, an AR display is provided to a user of headset vision system 10 when either left set of mirrors 50 or right set of mirrors 60 is selectively arranged into an extended configuration. In the AR display mode, one eye of the user is looking into lens 56 or lens 66 (e.g., the user sees left display 57 or right display 67, etc.). According to an exemplary embodiment, the AR display is configured to cover half of the field of vision of one eye of the user. For example, an AR display of screen 102 is projected onto an upper half of an eye of a user such that the user is able to see the AR display (e.g., left display 57 or right display 67, etc.) when looking above a horizon line and see a surrounding environment when looking below the horizon line. In other embodiments, the AR display is projected onto a greater or lesser portion of the eye of the user (e.g., more than 50% of the eye's field of vision, less than 50% of the eye's field of vision, etc.).

In another embodiment, a VR display is provided to a user of headset vision system 10 when left set of mirrors 50 and right set of mirrors 60 are selectively arranged in an extended configuration. In the VR display mode, the left and right eyes of the user are looking into lens 56 and lens 66, respectively (e.g., the user sees left display 57 and right display 67, etc.). In one embodiment, the VR display is configured to cover the entire field of vision of both eyes of the user such that the user only sees the reflection of screen 102. In other embodiments, the user may select a preferred amount of field of vision to be covered.

Figure 11:
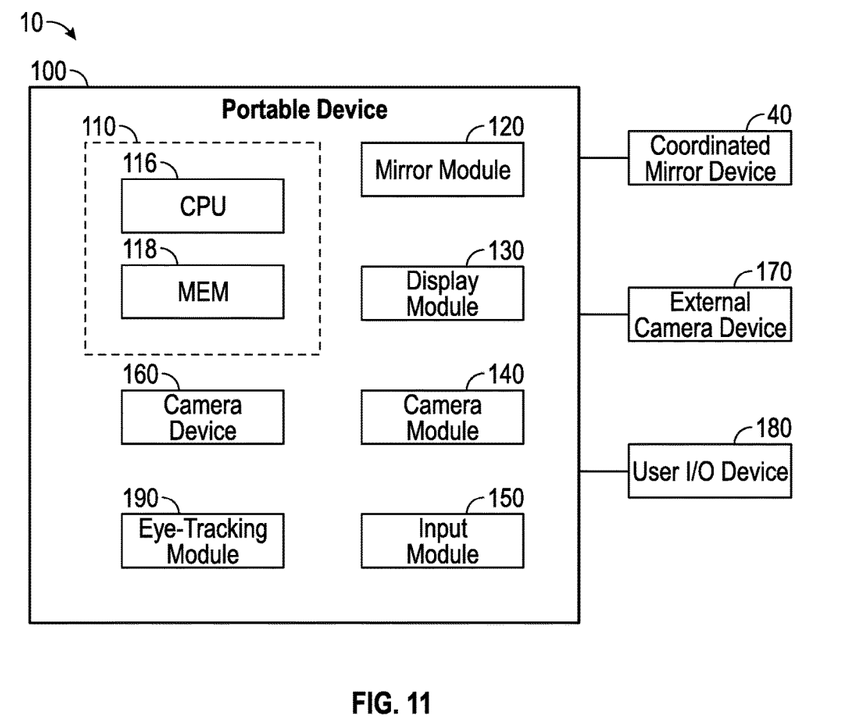
FIG. 11 is a schematic diagram of a headset vision system, according to an exemplary embodiment.

According to the exemplary embodiment shown in FIG. 11, headset vision system 10 includes coordinated mirror device 40, portable device 100, external camera device 170, and user input/output (I/O) device 180. As shown in FIG. 11, portable device 100 includes processing circuit 110, mirror module 120, display module 130, camera module 140, input module 150, and eye-tracking module 190. In one embodiment, processing circuit 110 is communicably coupled (e.g., via any suitable wired or wireless communication protocol, etc.) with at least one of mirror module 120, display module 130, camera module 140, input module 150, and eye-tracking module 190 such that processing circuit 110 may receive data from and send commands to the modules of portable device 100. According to an exemplary embodiment, an application (e.g., mobile application, computer application, etc.) or middleware is included with headset vision system 10. In one embodiment, the application is installed within processing circuit 110 of portable device 100 such that the various modules mentioned above are stored in portable device 100. By way of example, the application of headset vision system 10 may be configured to control operation of processing circuit 110 and/or the various modules while the portable device 100 is being used with headset vision system 10 for augmented and/or virtual reality.

As shown in FIG. 11, processing circuit 110 includes processor 116 and memory 118. Processor 116 may be implemented as a general-purpose processor, an application specific integrated circuit (ASIC), one or more field programmable gate arrays (FPGAs), a digital-signal-processor (DSP), a group of processing components, or other suitable electronic processing components. Memory 118 is one or more devices (e.g., RAM, ROM, Flash Memory, hard disk storage, etc.) for storing data and/or computer code for facilitating the various processes described herein. Memory 118 may be or include non-transient volatile memory or non-volatile memory. Memory 118 may include database components, object code components, script components, or any other type of information structure for supporting the various activities and information structures described herein. Memory 118 may be communicably connected to processor 116 and provide computer code or instructions to processor 116 for executing the processes described herein.

Referring still to FIG. 11, mirror module 120 may be configured to determine the arrangement of coordinated mirror device 40. For example, mirror module 120 may determine a distance (e.g., an amount of separation, etc.) between the upper and lower mirrors of the respective set of mirrors when left set of mirrors 50 and/or right set of mirrors 60 are extended. Display module 130 may be configured to provide a stereoscopic display on screen 102 such that two separate, but identical displays (e.g., of an image, video, game, etc.) are received by left set of mirrors 50 and right set of mirrors 60. In one embodiment, display module 130 is configured to create the stereoscopic display such that the stereoscopic display is correctly sized and positioned based on the distance between upper mirrors 52,62 and lower mirrors 54,64 determined by mirror module 120. Correctly sizing and positioning the stereoscopic display ensures that the AR or VR display presented to the user is properly focused by lens 56 and/or lens 66.

Camera module 140 may be configured to receive camera data from a camera. The camera data may include, but not limited to, an image, a video, a camera display of a surrounding area, and an infrared display of a surrounding area. As shown in FIGS. 1-2, 5-6, 8, and 11, in one embodiment, portable device 100 includes an internal camera, shown as camera device 160, positioned on back surface 104. In other embodiments, camera device 160 is otherwise positioned or omitted. For example, camera device 160 may be positioned along screen 102 in a front-facing arrangement (e.g., a "selfie" camera arrangement, to monitor the visual orientation of the eyes of the user of headset vision system 10, etc.). In still other embodiments, portable device 100 includes at least one of a first camera device positioned along back surface 104 and a second camera device positioned along screen 102. By way of example, camera device 160 may be any type of camera device, such as a still image and/or video camera. As shown in FIG. 2, upper portion 24 of hat 20 includes an aperture, shown as camera opening 28, positioned to align with camera device 160 of portable device 100. Camera opening 28 facilitates the use of camera device 160 to capture images, videos, IR scans, and the like of a surrounding environment (e.g., an environment in front of the user, etc.).

In another embodiment, portable device 100 is communicably coupled to an external camera, shown as external camera device 170. By way of example, external camera device 170 may be any type of camera device, such as a still image and/or video camera. By way of another example, external camera device 170 may be disposed on or within upper portion 24 of hat 20 such that external camera device 170 captures images, videos, IR scans, and the like of a surrounding environment. By way of yet another example, external camera device 170 may be positioned to monitor the visual orientation of the eyes of the user of the headset vision system 10. The external camera device 170 may use any suitable wired or wireless communication protocol (e.g., Bluetooth, Wi-Fi, etc.) to communicate data (e.g., images, video, IR scans, etc.) to portable device 100. In some embodiments, the headset vision system 10 includes a magnifier device configured to increase or decrease the magnification of the camera data (e.g., images, videos, camera display, etc.) acquired by camera device 160 or external camera device 170. In one embodiment, the magnification is capable of being greater than twenty times a standard view (e.g., a non-magnified view, etc.). In one embodiment, display module 130 is further configured to receive the camera data from camera module and create a stereoscopic display on screen 102 based on the captured images, videos, IR scans, etc.

Input module 150 is configured to receive one or more inputs from user I/O device 180 such that a user controls headset vision system 10 without accessing portable device 100 (e.g., without touching or removing portable device 100 from hat 20, etc.). The inputs from user I/O device 180 may include touch inputs, motion inputs, voice commands, and/or still other inputs. The inputs from user I/O device 180 may be configured to, but not limited to, turn headset vision system 10 on and/or off, extend or retract one or both of left set of mirrors 50 and right set of mirrors 60, select an application/program to view (e.g., a mobile game application, a book application, a GPS/maps application, etc.), operate the selected application/program, magnify, reposition, and/or rotate a view, and the like. In one embodiment, user I/O device 180 includes a mouse or touchpad. The mouse or touchpad may be configured to receive touch inputs such that a user may control operation of portable device 100. In other embodiments, user I/O device 180 includes a microphone configured to receive voice commands from the user. In an alternate embodiment, input module 150 receives the voice commands from a microphone included within portable device 100. In further embodiments, user I/O device 180 includes a motion sensor, a camera device, and/or a 3D mouse such that a user may control portable device 100 with motion inputs. For example, a user may point, reach, grab, swipe, select, etc. using hand motions/gestures. In another example, the motion inputs may be provided by a user of headset vision system 10 in the form of blinking.

Eye-tracking module 190 is configured to detect and/or track the visual orientation of the eyes of the user of headset vision system 10. Eye-tracking module 190 is configured to detect and track the different components of the eye, and coordinate the center of the eye (i.e., pupil) with an object on the screen 102 that the user is viewing. According to an exemplary embodiment, the detection of the user's visual orientation is based on the pixel intensity of the anatomical components of the eye (e.g., which may be aided by having a stable headset mount, etc.). By way of example, eye-tracking module 190 may receive eye-tracking data/information from camera device 160 and/or external camera device 170 (e.g., a front-facing camera, etc.). Camera device 160 and/or external camera device 170 may acquire a clear visualization of the eye(s) of the user of headset vision system 10. The visualization may be acquired from (but is not necessarily performed with) the reflection of the user's eye(s) received through the coordinated mirror device 40. Using the reflection of the user's eye(s) through the coordinated mirror device 40 may facilitate acquiring a stable and centralized view of the eye(s). The eye-tracking module 190 is thereby capable of detecting the object being visualized by the user on screen 102.

In some embodiments, eye-tracking module 190 is further configured to detect an input from the user of headset vision system 10 in the form of blinking. Eye-tracking module 190 may be configured to differentiate a purposeful (e.g., intentional, conscious, etc.) blink from a non-purposeful (e.g., natural, unconscious, etc.) blink. A user may therefore provide an input or command to control headset vision system 10 through blinking activity (e.g., blinking based commands, etc.). By way of example, a single purposeful blink may have one response (e.g., based on the direction of the visual orientation of the eyes of the user, to select an object on the display, etc.), and two purposeful blinks may have another response (e.g., based on the direction of the visual orientation of the eyes of the user, to go back a page or exit an application, zoom in, etc.). The blinking preferences may be preset or defined by the user of headset vision system 10. It should be understood that the actions taken in response to blinking may be similar to any type of action that may be performed in response to touch, voice, and/or motion inputs received by headset vision system 10.

According to an exemplary embodiment, eye-tracking may be useful for a surgeon or in sports and/activities where a user's hands are not free (e.g., rock climbing, bicycling, etc.). For example, the eye-tracking may work as a mouse, and with a blink, a user may select an object and/or a menu the user is seeing. As an example, in surgery, a menu may be provided where in response to a user looking at a desired selection and blinking, the surgeon may obtain more or less light, zoom in or out, and/or open up images (e.g., computerized tomography (CT) scans, etc.) if and when needed, among other possibilities. This may provide a beneficial hands-free capability. The eye-tracking may also be used complementary to a regular mouse or other form of input described above, as a user may select a drop down menu with a blinking command, and then use the mouse or other input device to scroll down to choose a desired selection.

According to an exemplary embodiment, the application/middleware of headset vision system 10 integrates the functions of portable device 100 and various applications (e.g., book applications, mobile game applications, movie applications, etc.) of the user's choice. Headset vision system 10 may be compatible with various actions ranging from casual use (e.g., browsing the internet, watching a movie, etc.) to performing surgery. By way of example, the VR functionality of headset vision system 10 may be used for playing video games, watching videos/movies, reading books, and the like provided through user selected applications stored on portable device 100.

In one embodiment, camera device 160 and/or external camera device 170 is used to acquire IR scans of a surrounding environment (e.g., at night, in a dark room, etc.). For example, a user may choose to use headset vision system 10, along with camera device 160 and/or external camera device 170, to provide an infrared display of a surrounding area (e.g., street, alley, park, room, etc.) such that the user is able to see if other people or animals are around (e.g., in close proximity, etc.) or better navigate through the dark. In other embodiments, headset vision system 10 integrates a camera display of a surrounding environment acquired by camera device 160 and/or external camera device 170 with overlaying information (e.g., directions, etc.). By way of example, an AR display of GPS directions may be displayed to a user such that the GPS directions are shown in the environment the user is looking (e.g., a turn arrow is displayed along a street the user is walking along signaling an upcoming turn is required, the GPS directions are overlayed onto the camera display, etc.).

According to an exemplary embodiment, the AR functionality of headset vision system 10 is used in a surgical procedure. Traditional AR systems overlay an AR image on a see through screen. However, the image displayed is captured from a camera that is not over (e.g., offset from, etc.) an eye of a user. The offset introduces inaccuracies which prevent traditional AR systems from being used in surgical procedures. Headset vision system 10 presents AR in a different and more accurate manner. Camera device 160 or external camera device 170 acquire a camera display of an area of interest (e.g., a surgical area of interest, etc.) and the camera display is provided (e.g., reflected, etc.) to an eye of the user (e.g., surgeon, etc.) with left set of mirrors 50 or right set of mirrors 60. The camera display is a true (e.g., exact, etc.) representation of the area of interest since the reflected camera display is exactly what the camera is capturing. In this regard, headset vision system 10 is able to provide accurate AR displays, thereby facilitating the use of headset vision system 10 in surgical procedures.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A headset vision system, comprising:
   a coordinated mirror device including a first set of mirrors and a second set of mirrors, each of the first set of mirrors and the second set of mirrors including a first mirror, a second mirror, and a lens, wherein the first mirror is configured to reflect a display of a portable device to the second mirror such that the second mirror reflects the display to the lens, wherein the lens is configured to focus the display, and wherein the first set of mirrors and the second set of mirrors are each independently and selectively reconfigurable between a storage configuration and an extended configuration; and
   a headwear defining an internal cavity configured to receive the portable device and at least a portion of the coordinated mirror device such that the portable device and the at least the portion of the coordinated mirror device are enclosed within the internal cavity.

2. The headset vision system of claim 1, wherein the coordinated mirror device extends from the internal cavity of the headwear and is configured to provide an augmented reality representation of the display to an eye of a user when arranged in a first configuration, and wherein the coordinated mirror device is disposed within the internal cavity of the headwear when arranged in a second configuration.

3. The headset vision system of claim 2, wherein the augmented reality representation of the display is projected on an upper half of the eye such that the user is able to see the display when looking above a horizon line and see a surrounding environment when looking below the horizon line.

4. The headset vision system of claim 2, further comprising a second coordinated mirror device including a third mirror, a fourth mirror, and a second lens, wherein the third mirror is configured to reflect the display to the fourth mirror such that the fourth mirror reflects the display to the second lens, wherein the second lens is configured to focus the display.

5. The headset vision system of claim 4, wherein the first coordinated mirror device and the second coordinated mirror device extend from the internal cavity of the headwear and are configured to provide a virtual reality representation of the display to both eyes of the user when both are arranged in the first configuration.

6. The headset vision system of claim 5, wherein the portable device, the first coordinated mirror device, and the second coordinated mirror device are disposed within the internal cavity of the headwear such that the portable device, the first coordinated mirror device, and the second coordinated mirror device are hidden when arranged in the second configuration.

7. The headset vision system of claim 1, further comprising the portable device configured to provide the display.

8. The headset vision system of claim 7, wherein the portable device includes at least one of a smartphone, a cell phone, a tablet, and an e-reader.

9. A headset vision system, comprising:
   a coordinated mirror device configured to provide at least one of an augmented reality representation of a display of a display device to a user and a virtual reality representation of the display of the display device to the user, the coordinated mirror device including:
      a first set of mirrors positioned to correspond with a first eye of the user; and
      a second set of mirrors positioned to correspond with a second eye of the user;

wherein the first set of mirrors and the second set of mirrors are each independently and selectively reconfigurable between a storage configuration and an extended configuration.

10. The headset vision system of claim 9, wherein the first set of mirrors includes:
   a first mirror;
   a second mirror positioned beneath and parallel to the first mirror, the second mirror selectively repositionable relative to the first mirror such that a distance between the first mirror and the second mirror is varied when the first set of mirrors is selectively reconfigured between the storage configuration and the extended configuration; and
   a first lens selectively positioned to focus the display of the display device for the first eye of the user.

11. The headset vision system of claim 10, wherein the second set of mirrors includes:
   a third mirror;
   a fourth mirror positioned beneath and parallel to the third mirror, the fourth mirror selectively repositionable such that a distance between the third mirror and the fourth mirror is varied when the second set of mirrors is selectively reconfigured between the storage configuration and the extended configuration; and
   a second lens selectively positioned to focus the display of the display device for the second eye of the user.

12. The headset vision system of claim 11, further comprising a hat including a first portion configured to rest on a head of the user and a second portion offset from the first portion such that the first portion and the second portion define a cavity therebetween.

13. The headset vision system of claim 12, wherein the display device, the first set of mirrors, and the second set of mirrors are disposed within the cavity of the hat such that the display device, the first set of mirrors, and the second set of mirrors are hidden within the cavity of the hat when the first set of mirrors and the second set of mirrors are selectively reconfigured into the storage configuration.

14. The headset vision system of claim 13, wherein the second mirror of the first set of mirrors or the fourth mirror of the second set of mirrors is selectively repositionable into the extended configuration such that the first lens of the first set of mirrors or the second lens of the second set of mirrors extends out of the cavity and is positioned to provide the augmented reality representation of the display to the first eye or the second eye of the user, respectively.

15. The headset vision system of claim 14, wherein both the second mirror of the first set of mirrors and the fourth mirror of the second set of mirrors are selectively repositionable into the extended configuration such that the first lens of the first set of mirrors and the second lens of the second set of mirrors extend out of the cavity and are positioned to provide the virtual reality representation of the display to the first eye and the second eye of the user.

16. A headset vision system, comprising:
   a coordinated mirror device including:
      a first set of mirrors positioned to correspond with a first eye of a user; and
      a second set of mirrors positioned to correspond with a second eye of the user, wherein the first set of mirrors and the second set of mirrors are each independently and selectively reconfigurable between a storage configuration and an extended configuration; and
   a non-transitory computer-readable storage medium having instructions stored thereon that, upon execution by a processor of a portable device, cause the processor to:
      determine an arrangement of the coordinated mirror device;
      provide a stereoscopic display on a screen of the portable device based on the arrangement of the coordinated mirror device such that the stereoscopic display is correctly sized and positioned on the screen; and
      receive inputs from a user of the headset vision system such that the user is able to control the headset vision system without accessing the portable device;
   wherein the headset vision system is configured to provide at least one of an augmented reality representation of the stereoscopic display and a virtual reality representation of the stereoscopic display to the user via the coordinated mirror device.

17. The headset vision system of claim 16, wherein the non-transitory computer-readable storage medium having instructions stored thereon that, upon execution by the processor of the portable device, cause the processor to at least one of:
   track a visual orientation of the eyes of the user to detect an object of the stereoscopic display being visualized by the user; and
   detect an input from the user of the headset vision system in the form of blinking such that the user may at least partially control the headset vision system with blinking commands.

18. The headset vision system of claim 16, wherein the non-transitory computer-readable storage medium having instructions stored thereon that, upon execution by the processor of the portable device, cause the processor to receive camera data from at least one of a camera device of the portable device and an external camera device, wherein the camera data includes at least one of an image, a video, a camera display of a surrounding area, and an infrared display of the surrounding area.

19. The headset vision system of claim 16, wherein the stereoscopic display includes at least one of a display of an image, a video, a videogame, a book, a text message, an email, a mobile application, a website, a camera display of a surrounding area, and an infrared display of the surrounding area.

20. The headset vision system of claim 16, wherein the processor is communicably coupled to at least one of a mouse, a microphone, a touchpad, a motion sensor, a camera device, and a 3D mouse such that the user of the headset vision system provides at least one of touch inputs, motion inputs, and voice commands to the headset vision system.

* * * * *